US009868619B2

(12) United States Patent
Miller

(10) Patent No.: US 9,868,619 B2
(45) Date of Patent: Jan. 16, 2018

(54) SELF-ENGAGING CLUTCH

(71) Applicant: Ramsey Winch Company, Tulsa, OK (US)

(72) Inventor: Jonathan A. Miller, Skiatook, OK (US)

(73) Assignee: Ramsey Winch Company, Tulsa, OK (US)

( * ) Notice: Subject to any disclaimer, the term of this patent is extended or adjusted under 35 U.S.C. 154(b) by 115 days.

(21) Appl. No.: 14/932,657

(22) Filed: Nov. 4, 2015

(65) Prior Publication Data

US 2016/0130121 A1   May 12, 2016

Related U.S. Application Data

(60) Provisional application No. 62/076,234, filed on Nov. 6, 2014.

(51) Int. Cl.
*B66D 1/20* (2006.01)
*B66D 1/22* (2006.01)
*F16H 19/00* (2006.01)
*B66C 1/22* (2006.01)

(52) U.S. Cl.
CPC ............... *B66D 1/225* (2013.01); *B66C 1/22* (2013.01); *F16H 19/001* (2013.01); *F16H 2019/008* (2013.01)

(58) Field of Classification Search
CPC ... B66D 1/16; B66D 1/22; B66D 1/24; B66D 3/22; F16H 2019/008
See application file for complete search history.

(56) References Cited

U.S. PATENT DOCUMENTS

| | | | | |
|---|---|---|---|---|
| 3,296,893 A * | 1/1967 | Shaffer | ................... | B66D 1/08 254/344 |
| 4,192,409 A * | 3/1980 | Ueda | ....................... | B66D 1/22 192/225 |
| 4,545,567 A * | 10/1985 | Telford | ................... | B66D 1/22 188/337 |
| 5,860,635 A * | 1/1999 | Morfitt | .................... | B63B 23/48 188/290 |
| 7,648,125 B1 * | 1/2010 | Huang | .................... | B66D 1/22 254/344 |
| 7,891,641 B1 | 2/2011 | Miller | | |
| 8,066,261 B2 | 11/2011 | Mann | | |
| 8,272,493 B1 | 9/2012 | Grengs | | |
| 8,469,115 B2 | 6/2013 | Kondo et al. | | |
| 8,517,347 B2 | 8/2013 | Forster | | |
| 8,523,147 B2 | 9/2013 | Zheng | | |
| D703,414 S | 4/2014 | Fretz et al. | | |
| 9,315,364 B2 * | 4/2016 | Averill | ..................... | B66D 1/12 |
| 2014/0252286 A1 * | 9/2014 | Averill | ..................... | B66D 1/16 254/344 |

* cited by examiner

*Primary Examiner* — Emmanuel M Marcelo
(74) *Attorney, Agent, or Firm* — GableGotwals

(57) ABSTRACT

An improved self-engaging clutch having a carrier plate with one or more clutch actuator fingers formed into the carrier plate.

20 Claims, 4 Drawing Sheets

SELF-ENGAGING CLUTCH

CROSS-REFERENCE TO RELATED APPLICATIONS

The present application is a continuation-in-part of U.S. Provisional Patent Application No. 62/076,234 filed on Nov. 6, 2014. This parent application is incorporated herein by reference.

FIELD OF THE INVENTION

The present invention relates generally to improvements to a self-engaging clutch. More particularly, the present invention relates to a carrier plate having one or more actuator fingers formed from the carrier plate.

BACKGROUND OF THE INVENTION

The present invention is an improvement to the Manual Disengaging and Self-Engaging Clutch disclosed in U.S. Pat. No. 7,891,641 (the '641 Patent). The '641 Patent is incorporated herein by reference.

The '641 Patent relies on an engaging plate with one or more bores formed radially in the circumferential edge of the engaging plate. Each bore has a coil spring inserted into it along with a plunger pin. It is this structure that is used to engage the clutch.

The shortfall of the design of the engaging plate shown in FIG. 8 of the '641 Patent is that it requires extensive and precise machining of the engaging plate. This adds to the cost of manufacture of the device.

What is needed, therefore, is an improved engaging plate that does not require extensive machining.

BRIEF DESCRIPTION OF THE INVENTION

The present invention achieves its objections by providing an engaging plate that is useable with the self-engaging clutch found in the '641 Patent. FIGS. 2-4 of this application show the improved mechanism in use on a winch with a three stage planetary gear drive. The clutch action occurs on the third stage gear set. When the clutch is disengaged, the ring gear of the third stage rotates freely within the winch housing. Thus, the motor input shaft is disengaged from the drum. This is seen in FIG. 3.

In the engaged position, as best seen in FIG. 4, the clutch plunger is in one of the clutch engagement cavities of the third stage ring gear. This locks the third stage ring gear relative to the winch housing. This causes the rotation of the motor input shaft to be transferred through the output gear set or third stage and onto the rotation of the drum. In the engaged position, the motor input shaft is engaged with the drum.

The present invention has a clutch actuator finger that is cut into or otherwise formed from the second stage carrier plate. The clutch actuator finger has suitable dimensions to provide a resilient or springy character. Thus, the actual dimensions of the clutch actuator finger are dependent upon the characteristics of the material and dimensions of the carrier plate.

With the semi-automatic clutch in a disengaged position, the carrier plate rotates about the center line of the planetary gear drive. This causes the clutch actuator finger to push on the shoulder of the actuator. As the finger pushes the actuator past center, a spring force pushes the clutch plunger to the engaged position where it locks the third stage ring gear relative to the winch case. The clutch can be disengaged by the operator rotating the clutch handle such that the linkage pulls the clutch plunger out of the clutch engagement cavity of the third stage ring gear.

The present invention may also incorporate more than one clutch actuator finger on the carrier plate. This configuration would have the benefit of only requiring a partial revolution of the carrier plate before the clutch is engaged. For example, if two clutch actuator fingers are used, it would only take half a revolution of the carrier plate to engage the clutch. Similarly, if four clutch actuator fingers are used, it would only take a quarter revolution of the carrier plate before the clutch is engaged.

BRIEF DESCRIPTION OF THE DRAWINGS

Preferred embodiments of the invention will now be shown in further detail. Other features, aspects, and advantages of the present invention will become better understood with regard to the following detailed description, appended claims, and accompanying drawings (which are not to scale) where:

DETAILED DESCRIPTION OF THE PREFERRED EMBODIMENT

Figure 1:
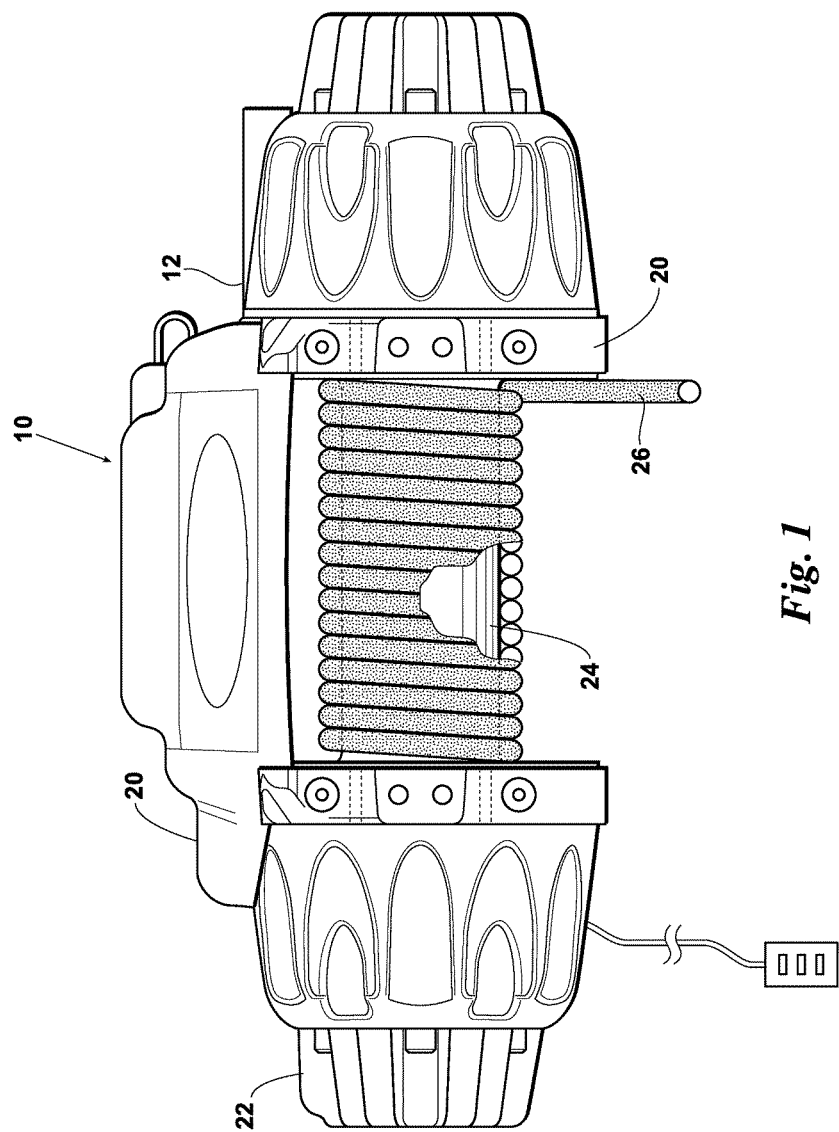
FIG. 1 is a front view of a winch with a planetary gear drive.
Figure 2:
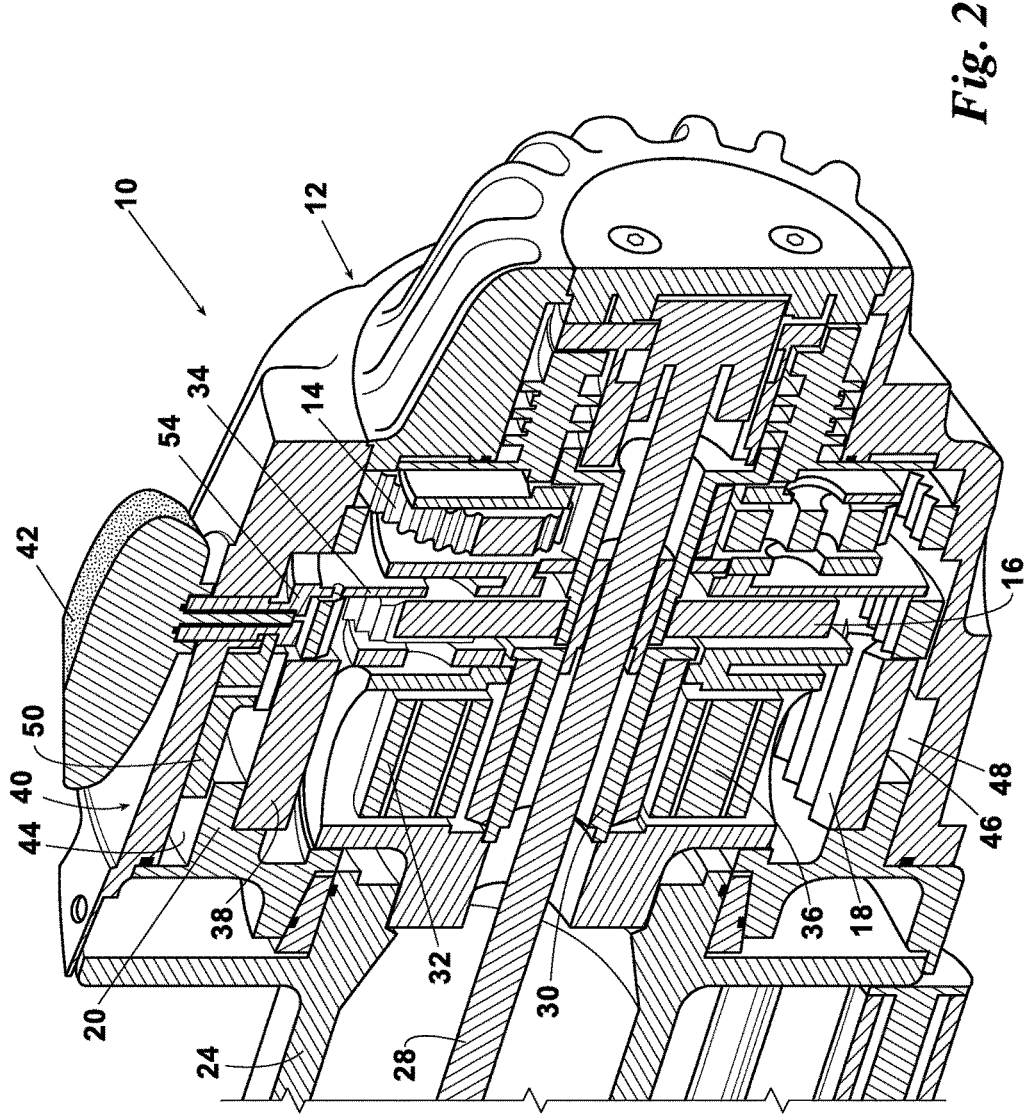
FIG. 2 is a cross section view of a winch with a planetary gear drive containing an embodiment of the present invention.
Figure 3:
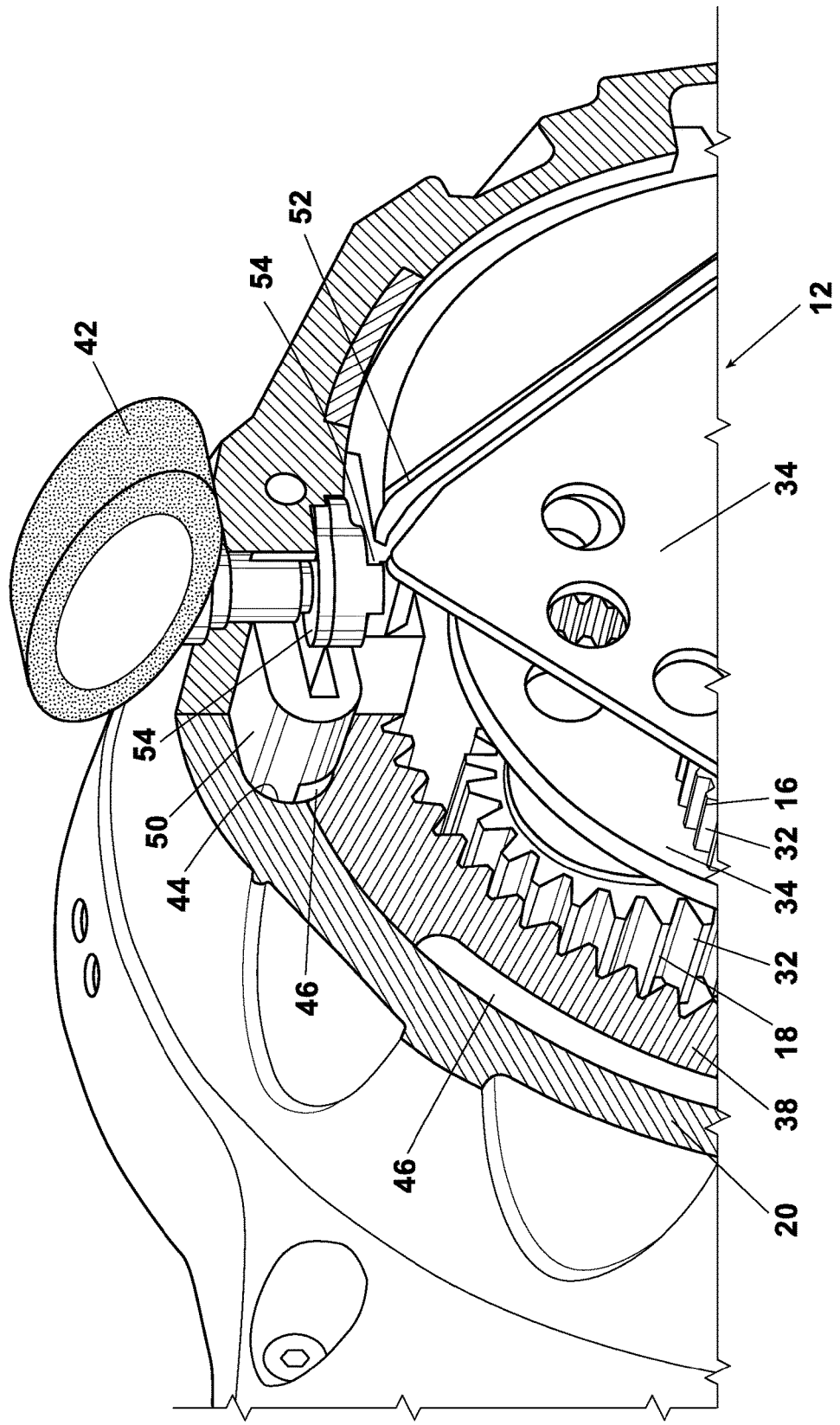
FIG. 3 is a sectional view of an embodiment of the present invention with the mechanism in the dis-engaged position.
Figure 4:
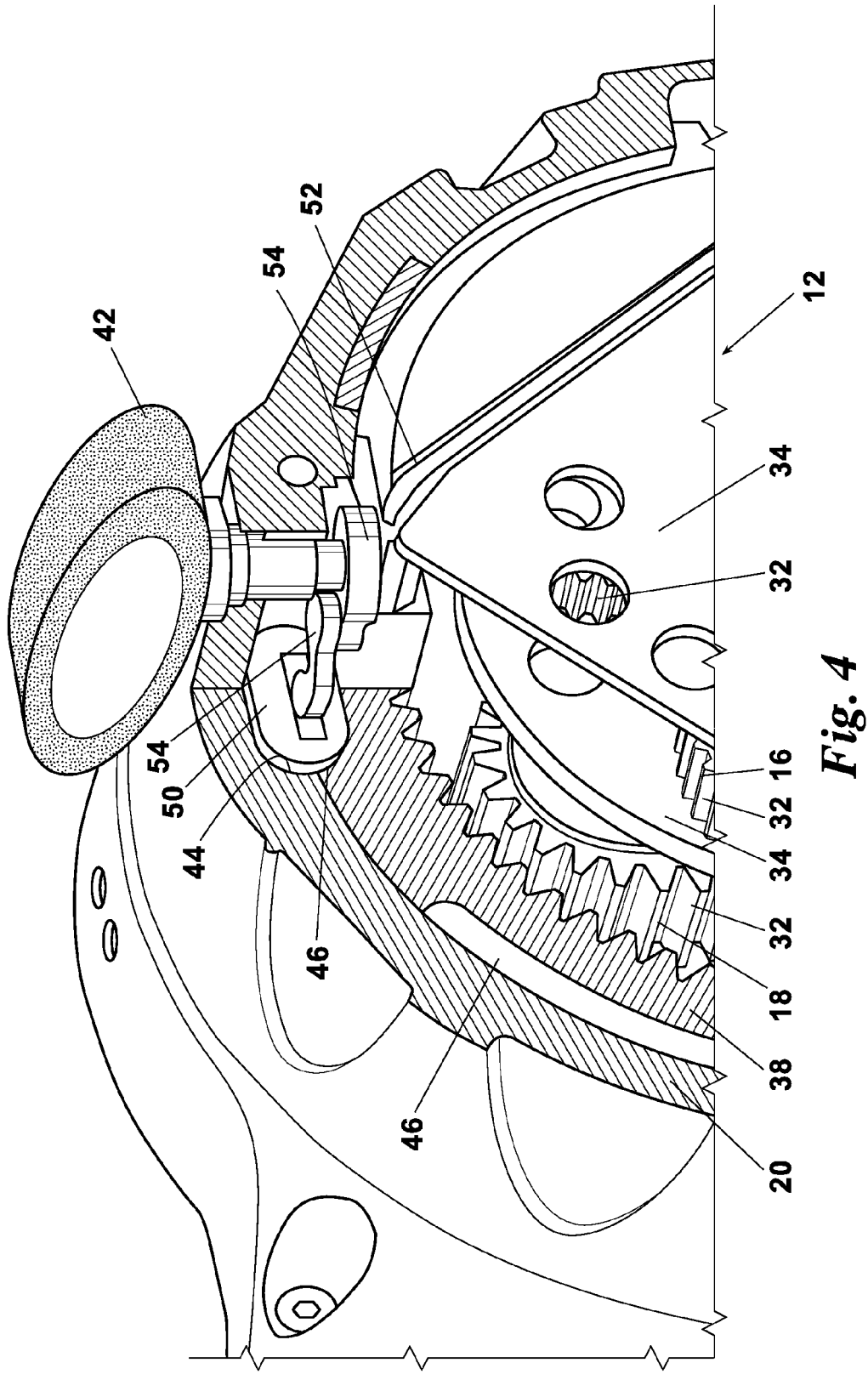
FIG. 4 is a sectional view of an embodiment of the present invention with the mechanism in the engaged position.

Turning now to the drawings wherein like reference characters indicate like or similar parts throughout, FIG. 1 illustrates a winch 10 with a planetary gear drive 12. FIGS. 2-4 provide cross section views to better explain the invention. In this case the planetary gear drive 12 has a first, a second and a third planetary gear set 14, 16 and 18. The winch 10 has a frame 20 carrying a motor 22, drum 24 and planetary gear drive 12. Line 26 is wound on the drum 24. Rotational power is transferred from the motor 22 to the planetary gear drive 12 via a drive shaft 28 passing through the hollow center of the drum 24. The rotational power is transferred from the planetary gear drive 12. Thus the motor 22 can be used to wind and unwind the line 26 from the drum 24. The drum 24 can also be placed in a free wheel condition by disengaging the clutch 40. This allows the line 26 to freely unwind from the drum 24.

Each of the first, second and third planetary gear set 14, 16 and 18 have a sun gear 30 with a plurality of planet gears 32 engaging with and orbiting around the sun gear 30. Each planet gear 32 is mounted on the planet carrier 34 by a planet pin 36. Each gear set 14, 16 and 18 also has a ring gear 38 extending around and engaging with the planet gears 32.

Rotational power is transmitted from the first gear set 14 to the second gear set 16 and on to the third gear set 18 in a manner that is well known in the art. When the clutch 40 is disengaged the ring gear 38 of the third gear set 18 is allowed to rotate relative to the frame 20. Thus the rotational power is not transmitted onto the drum 24. This rotational power can be transmitted to the drum by engaging the clutch 40. This locks the ring gear 38 of the third gear set 18 relative to the frame 20 of the winch 10 and causes the rotation power to be transferred through the third gear set 18 and into the drum 24.

The clutch 40 can be manually engaged or disengaged through operation of the handle 42. The frame 20 has a cavity 44 located adjacent to the ring gear 38 of the third gear sets 18. The exterior surface 46 of the ring gear 38 has one or more cavities 48 which pass next to the cavity 44 in the frame 20. There is a pin 50 adjacent to the handle 42 such that movement of the handle 42 causes the pin 50 to move into and out of the cavities 44 and 48.

When the pin 50 is extended it fits into the cavities 44 and 48. This locks the ring gear 18 stationary relative to the frame 20 and places the clutch 40 in the engaged position. The rotational power is then transferred to rotating the drum 24 either in or out.

The planet carrier 34 of the second gear set 16 has a clutch actuator finger 52. The finger 52 is located such that as the planet carrier 34 of the second gear set 16 rotates it contacts the clutch actuator 54. This moves the pin 50 into the engaged position such that the ring gear 38 of the third gear set 18 is locked relative to the frame 20 of the winch 10. Thus the clutch 40 is engaged and the motor 22 is engaged with the drum 24.

In the preferred embodiment, the clutch actuator finger 52 is elongated and extends beyond the edge of the planet carrier 34. It is also cut or stamped from the same material as the planet carrier 34. Thus, when the planet carrier 34 is formed or cut the clutch actuator finger 52 is cut from the same plate or material. Further, a plurality of clutch actuator fingers 52 may be located on the planet carrier 34. Thus, the planet carrier 34 would only have to rotate a fraction of a revolution before one of the clutch actuator fingers 52 contacts the clutch actuator 54 and engages the clutch 40. For example, if there are two clutch actuator fingers 52, the planet carrier 34 does not have to rotate more than 180 degrees before the clutch 40 is engaged. If there are four clutch actuator fingers 52, the planet carrier 34 does not have to rotate more than 90 degrees before the clutch 40 is engaged.

The foregoing description details certain preferred embodiments of the present invention and describes the best mode contemplated. It will be appreciated, however, that changes may be made in the details of construction and the configuration of components without departing from the spirit and scope of the disclosure. Therefore, the description provided herein is to be considered exemplary, rather than limiting, and the true scope of the invention is that defined by the following claims and the full range of equivalency to which each element thereof is entitled.

What is claimed is:

1. An improved self-engaging clutch for a planetary gear winch, said self-engaging clutch comprising:
    a planetary winch having a motor, a planetary gear drive, a clutch and a drum mounted on a frame, wherein the clutch is capable of engaging and disengaging the drum from the motor;
    the planetary gear drive having a first, a second and a third planetary gear set, each gear set having a sun gear, a plurality of planet gears each mounted to a planet carrier by a planet pin, the plurality of planet gears orbiting around and engaging with the sun gear, and a ring gear surrounding and engaging with the planet gears;
    the clutch having one or more cavities located on an exterior surface of the ring gear of the third gear set, a cavity located on the frame adjacent to the ring gear of the third gear set, a clutch actuator, a clutch actuator finger on the planet carrier of the second gear set and a pin moveable between an engaged position and a disengaged position, wherein the clutch actuator finger is capable of moving the pin between the disengaged position and the engaged position.

2. The improved self-engaging clutch of claim 1 further comprising the clutch actuator finger being formed from the planet carrier of the second gear set.

3. The improved self-engaging clutch of claim 2 further comprising the clutch actuator finger including a plurality of clutch actuator fingers formed from the planet carrier of the second gear set.

4. The improved self-engaging clutch of claim 1 further comprising:
    a handle engaged with the clutch actuator;
    wherein the handle is operable to move the pin between the engaged and disengaged position.

5. The improved self-engaging clutch of claim 1, wherein the ring gear of the third gear set is locked relative to the frame in the engaged position.

6. The improved self-engaging clutch of claim 1, wherein the ring gear of the third gear set is free relative to the frame in the disengaged position.

7. The improved self-engaging clutch of claim 1, wherein the drum is engaged with the motor when the clutch is in the engaged position.

8. The improved self-engaging clutch of claim 1, where the drum freely rotates relative to the motor when the clutch is in the disengaged position.

9. The improved self-engaging clutch of claim 1 further comprising the clutch actuator finger being connected to the planet carrier of the second gear set.

10. The improved self-engaging clutch of claim 9 further comprising the clutch actuator finger including a plurality of clutch actuator fingers connected to the planet carrier of the second gear set.

11. An improved self-engaging clutch for a planetary gear winch including a first, a second, and a third planetary gear set, said self-engaging clutch comprising:
    one or more cavities located on an exterior surface of a ring gear of the third planetary gear set;
    a cavity located on a frame adjacent to the ring gear of the third planetary gear set;
    a clutch actuator;
    a clutch actuator finger on a planet carrier of the second planetary gear set; and
    a pin moveable between an engaged position and a disengaged position;
    wherein the clutch actuator finger is arranged to move the pin between the disengaged position and the engaged position.

12. The improved self-engaging clutch of claim 11 further comprising the clutch actuator finger being formed from the planet carrier of the second gear set.

13. The improved self-engaging clutch of claim 12 further comprising the clutch actuator finger including a plurality of clutch actuator fingers formed from the planet carrier of the second gear set.

14. The improved self-engaging clutch of claim 11 further comprising:
    a handle engaged with the clutch actuator;
    wherein the handle is operable to move the pin between the engaged and disengaged position.

15. The improved self-engaging clutch of claim 11, wherein the ring gear of the third planetary gear set is locked relative to the frame in the engaged position.

16. The improved self-engaging clutch of claim 11, wherein the ring gear of the third gear set is free relative to the frame in the disengaged position.

17. The improved self-engaging clutch of claim 11 further comprising the clutch actuator finger being connected to the planet carrier of the second gear set.

18. The improved self-engaging clutch of claim 11 further comprising the clutch actuator finger including a plurality of clutch actuator fingers connected to the planet carrier of the second gear set.

19. An improved self-engaging clutch for a planetary gear winch including a first, a second, and a third planetary gear set, said self-engaging clutch comprising:
- a cavity located on an exterior surface of a ring gear of the third planetary gear set;
- a cavity located on a frame adjacent to the ring gear of the third planetary gear set;
- a clutch actuator;
- at least one clutch actuator finger on a planet carrier of the second planetary gear set; and
- a pin moveable between an engaged position and a disengaged position;

wherein the at least one clutch actuator finger is arranged to move the pin between the disengaged position and the engaged position.

20. The improved self-engaging clutch of claim 19 further comprising:
- a handle engaged with the clutch actuator;
- wherein the handle is operable to move the pin between the engaged and disengaged position.

* * * * *